United States Patent
Kato

(10) Patent No.: US 10,237,815 B2
(45) Date of Patent: Mar. 19, 2019

(54) RADIO COMMUNICATION TERMINAL AND FREQUENCY ASSIGNMENT METHOD

(71) Applicant: Panasonic Intellectual Property Management Co., Ltd., Osaka (JP)

(72) Inventor: Osamu Kato, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/551,874

(22) PCT Filed: Feb. 25, 2016

(86) PCT No.: PCT/JP2016/001000
§ 371 (c)(1),
(2) Date: Aug. 17, 2017

(87) PCT Pub. No.: WO2016/170719
PCT Pub. Date: Oct. 27, 2016

(65) Prior Publication Data
US 2018/0041945 A1 Feb. 8, 2018

(30) Foreign Application Priority Data

Apr. 24, 2015 (JP) .................. 2015-089818

(51) Int. Cl.
*H04W 48/16* (2009.01)
*H04W 72/02* (2009.01)
(Continued)

(52) U.S. Cl.
CPC ........... *H04W 48/16* (2013.01); *H04W 48/18* (2013.01); *H04W 72/02* (2013.01); *H04W 72/0453* (2013.01); *H04W 88/06* (2013.01)

(58) Field of Classification Search
CPC . H04W 48/16; H04W 48/18; H04W 72/0453; H04W 88/06; H04W 72/02; H04M 1/00
See application file for complete search history.

(56) References Cited

U.S. PATENT DOCUMENTS

| | | | |
|---|---|---|---|
| 9,615,376 B2 | 4/2017 | Kato | |
| 2013/0195078 A1* | 8/2013 | Kobayashi | H04W 36/0055 370/331 |
| 2015/0043504 A1 | 2/2015 | Kato | |

FOREIGN PATENT DOCUMENTS

| | | |
|---|---|---|
| JP | 2010-193088 A | 9/2010 |
| JP | 2013-232815 A | 11/2013 |
| JP | 2015-008357 A | 1/2015 |

OTHER PUBLICATIONS

International Search Report, dated Apr. 5, 2016, for corresponding International Application No. PCT/JP2016/001000, 2 pages.
(Continued)

*Primary Examiner* — Dady Chery
(74) *Attorney, Agent, or Firm* — Seed IP Law Group LLP

(57) ABSTRACT

There is provided a radio communication terminal that can improve the efficiency of assignment of or the efficiency of usage of a radio resource for communicating user data between a radio communication terminal and a radio base station apparatus. The radio communication terminal communicates with a radio base station apparatus through a network in which a plurality of radio communication schemes are present for use in a mixed manner, and includes a processor and an antenna. The processor locates a connection base station as a radio base station apparatus that communicates user data with the radio communication terminal, among a plurality of the radio base station apparatuses, and assigns a radio frequency relating to communication of user data between the connection base station and the radio communication terminal, based on information that is the usage history of a radio frequency relating to the communication of the user data with every radio base station apparatus.

8 Claims, 7 Drawing Sheets

(51) Int. Cl.
*H04W 88/06* (2009.01)
*H04W 72/04* (2009.01)
*H04W 48/18* (2009.01)

(56) References Cited

OTHER PUBLICATIONS

Nakao et al., "[Invited Talk] Activities on heterogeneous networks for 5G—C-plane/U-plane Splitting Control in Heterogeneous Networks-," IEICE Technical Report, Oct. 2014, 8 pages. (With English Abstract and partial summary).
NTT DOCOMO, Inc. "DOCOMO 5G White Paper—5G Radio Access: Requirements, Concept and Technologies," Jul. 2014, 27 pages. (With Japanese counterpart).
Sampei, "A Study on Technical Directions of Wireless Access and Networking for 5G Cellular Systems," IEICE Technical Report, Oct. 2014, 8 pages. (With English Abstract and partial summary).

* cited by examiner

FIG. 3

| TERMINAL | | HISTORY OF COMMUNICATION DURING PAST FIXED PERIOD OF TIME | | | |
|---|---|---|---|---|---|
| (TERMINAL LOCATION) | AREA NUMBER | (BASE STATION ID) | RAT | NUMBER OF TIMES OF COMMUNICATION | AMOUNT OF COMMUNICATION |
| (LATITUDE) 135,412658 (LONGITUDE) 37,209415 | 18638251 | BS#6 BS#5 | WIRELESS LAN LTE-Advanced | 90 TIMES 32 TIMES | 317,8MB 51,0MB |
| (LATITUDE) 135,936408 (LONGITUDE) 36,731214 | 18652008 | BS#18 BS#14 | WiGig LTE | 56 TIMES 11 TIMES | 47,8MB 8,3MB |
| (LATITUDE) 138,534256 (LONGITUDE) 37,216409 | 21359765 | BS#71 | LTE-Advanced | 4 TIMES | 10,0MB |

T1

RADIO COMMUNICATION TERMINAL AND FREQUENCY ASSIGNMENT METHOD

CROSS-REFERENCE TO RELATED APPLICATION

This application is a U.S. national stage application of the PCT International Application No. PCT/JP2016/001000 filed on Feb. 25, 2016, which claims the benefit of foreign priority of Japanese patent application 2015-089818 filed on Apr. 24, 2015, the contents all of which are incorporated herein by reference.

TECHNICAL FIELD

The present disclosure relates to a radio communication terminal and a frequency assignment method.

BACKGROUND ART

When a terminal performs radio communication, there is a need to determine a radio base station to which the terminal makes a radio connection and to determine a radio frequency (a radio channel) that is used by the terminal for radio communication. In the related art, a radio base station selection apparatus is known that searches for the radio base station and the radio channel for selection using active scan or passive scan (for example, PTL 1).

The radio base station selection apparatus creates a connection candidate AP list in which identification information of and a reception level of the radio base station are associated with each other for every radio channel. The radio base station selection apparatus selects one radio base station that has a reception level which exceeds a predetermined threshold and that has identification information with a high priority level, and a corresponding channel from the connection candidate AP list. The radio base station selection apparatus performs processing that makes a connection to the selected radio base station on the selected radio channel.

Furthermore, in recent years, a heterogeneous network in a radio communication system in which the terminal and the radio base station apparatus is connected to a network has been under study (for example, NPL 1 to NPL 3).

CITATION LIST

Patent Literature

PTL 1: Japanese Patent Unexamined Publication No. 2010-193088

Non-Patent Literature

NPL 1: NAKAO Seigo, YAMAMOTO Tetsuya, OKASAKA Shozo, SUZUKI Hidetoshi, "Activities on heterogeneous networks for 5G: C-plane/U-plane Splitting Control in Heterogeneous Networks", IEICE technical report, p 83-88, October 2014
NPL 2: SAMPEI Seiichi, "A Study on Technical Directions of Wireless Access Networking for 5G Cellular Systems", IEICE technical report, P 153-P 158, October 2014
NPL3: "DoCoMo 5G White Paper—Required Conditions and Technical Concepts in 5G Radio Access After 2020", NTT DoCoMo, P 1-14, September 2014

SUMMARY OF THE INVENTION

In a technology that is disclosed in PTL 1, the efficient of assignment of or the efficiency of usage of a radio resource for communicating user data between a terminal and a radio base station is insufficient.

The present disclosure, which is provided in view of the situation described above, provides a radio communication terminal and a frequency assignment method that can improve the efficiency of assignment of or the efficiency of usage of a radio resource for communicating user data between a radio communication terminal and a radio base station apparatus.

The radio communication terminal in the present disclosure communicates with a radio base station apparatus through a network in which a plurality of radio communication schemes are present for use in a mixed manner. The radio communication terminal includes a processor and an antenna. The processor locates a connection base station as a radio base station apparatus that communicates user data with the radio communication terminal, among a plurality of the radio base station apparatuses, and assigns a radio frequency relating to communication of user data between the connection base station and the radio communication terminal, based on information that is the usage history of a radio frequency relating to the communication of the user data with every radio base station apparatus. Through the antenna, the user data is communicated between terminal itself and the connection base station using the assigned radio frequency.

According to the present disclosure, the efficiency of assignment of or the efficiency of usage of a radio resource for communicating user data between a radio communication terminal and a radio base station apparatus can be improved.

BRIEF DESCRIPTION OF DRAWINGS

FIG. 3 is a schematic diagram illustrating an example of history database T1.

DESCRIPTION OF EMBODIMENTS

Embodiments will be described in detail below, suitably with reference to the drawings. However, in some cases, the descriptions that are in greater detail than is necessary are omitted. For example, in some cases, a detailed description of a matter is already known, or a repeated description of substantially the same configuration is omitted. This serves to prevent the following descriptions from being unnecessarily redundant and to provide an easy understanding to a person of ordinary skill in the related art. Moreover, the accompanying drawings and the following descriptions are provided in order for a person of ordinary skill in the related art to sufficiently understand the present disclosure, but this is not intended to limit subjects that are set forth in claims.

Background and Development History of Embodiments of the Present Disclosure

In a heterogeneous network, radio base stations that have various radio specifications or cell radii are present in a mixed manner. For this reason, it is difficult to suppress communication interference between a radio frequency (a frequency or time) that is assigned for communication between a terminal and a radio base station, and a radio resource that is used in the neighboring terminal or radio base station. For this reason, it is expected that the communication interference occurs in each part within the heterogeneous network and that radio resource assignment processing for avoiding the communication interference occurs frequently. More precisely, the efficiency of the assignment of the radio resource is insufficient.

Furthermore, in order to simplify the radio resource assignment processing, it is considered that a radio resource is divided in advance for assignment to each radio base station, but in this case, the efficiency of usage of the radio resource is lowered.

A radio communication terminal and a frequency assignment method that can improve the efficiency of the assignment of or the efficiency of the usage of the radio resource for communicating user data between the radio communication terminal and the radio base station apparatus will be described below.

First Embodiment

[Configuration and the Like]

Figure 1:
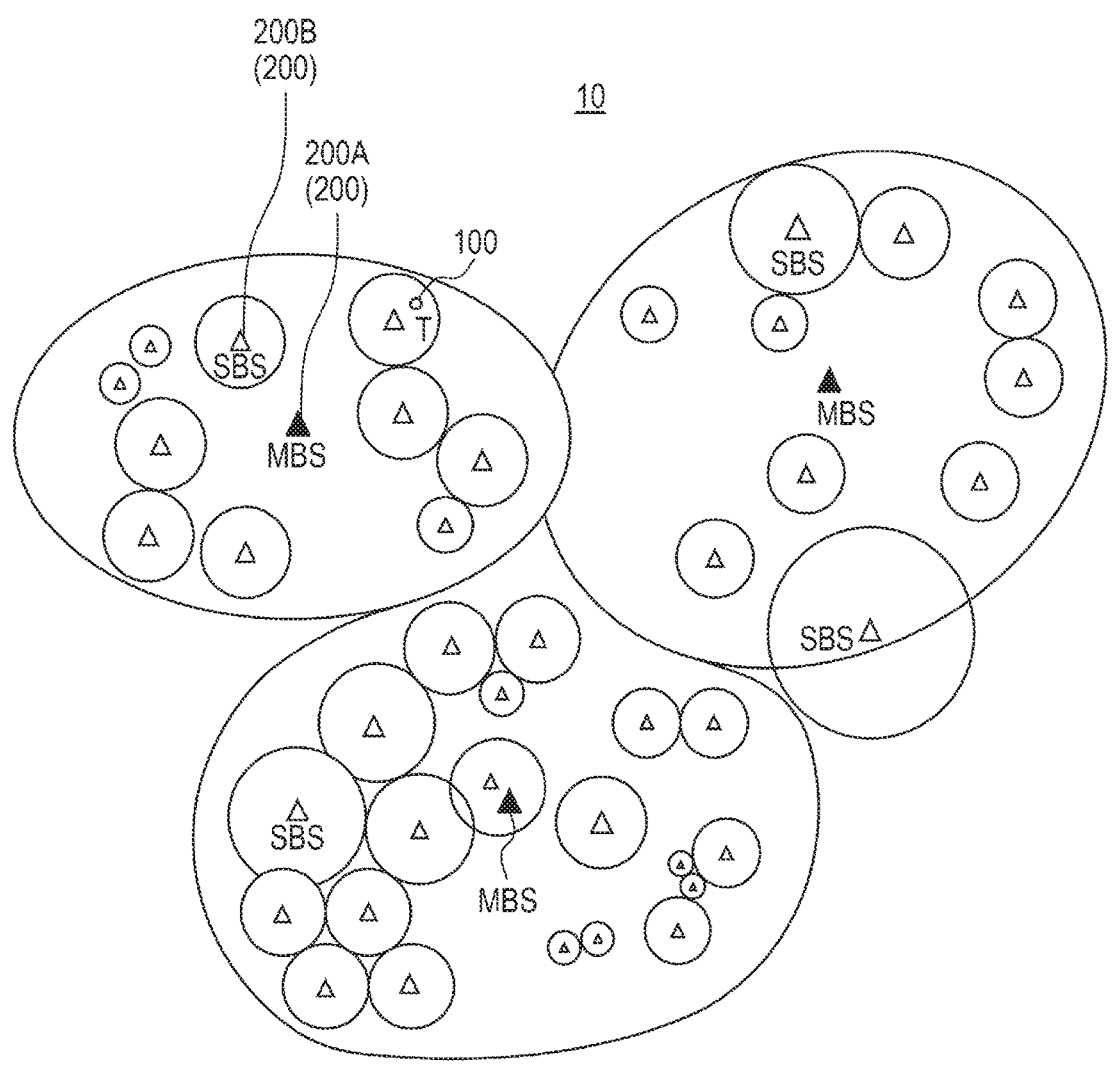
FIG. 1 is a schematic diagram illustrating an example of a configuration of a radio communication system according to a first embodiment.

FIG. 1 is a schematic diagram illustrating an example of a configuration of radio communication system 10 according to a first embodiment. Radio communication system 10 includes one or more terminals 100 and one or more base stations 200. Terminal 100 and base station 200 are connected to each other through a radio circuit.

Radio communication system 10 is a heterogeneous network in which base station 200 to which terminal 100 has to make a connection complies with various radio specifications. Terminal 100 communicates with base station 200. In the heterogeneous network, base stations 200 that have different radio communication schemes (for example, a Radio Access Technology (RAT)) or different cell radii are present in a fixed manner. In the heterogeneous network, for example, not only are a plurality of types of radio specifications present in a mixed manner, but also base stations 200 that have different cell radii overlap in area. The RAT, for example, includes pieces of information on radio communication specifications and on radio frequencies.

The heterogeneous network may not be a network that is of a C/U separation type, and may be a network that is of a C/U separation type. In the present embodiment, an example of the network that is not of a C/U separation type is given. More precisely, an example in which radio communication system 10, communication relating to control data and communication relating to user data are performed by same base station 200 is given.

Base station 200 includes macro cell base station 200A and small cell base station 200B. Terminal 100 communicates the control data and communicates the use data with any one of macro cell base station 200A and small cell base station 200B. The control data includes data relating to Control (C)-Plane. The user data includes data relating to User (U)-Plane. Pieces of user data, for example, include image data (for example, a moving image or a still image) and audio data, and can include data of which a size is larger in terms of data mount.

C-plane is a communication protocol for communicating control data for call connection or radio resource assignment in radio communication. U-plane is a communication protocol for actually performing communication (for example, video communication, audio communication, or data communication) using the assigned radio resource between terminal 100 and base station 200.

A cell radius of macro cell base station 200A, for example, ranges from 1 km to several km, and is comparatively great. A RAT that is employable by macro cell base station 200A, for example, is one type (for example, LTE). The cell radius is equivalent to the maximum transfer distance of base station 200.

A cell radius of small cell base station 200B, for example, ranges from 10 m to 100 m, and is comparatively small. There are many RATs that are employable by small cell base station 200B, and a plurality of types of RATs are present. For example, it is also considered that the cell radius may be equal to or greater than 100 m in a mountain area, a desert region, and a forest area, and that the cell radius is greater than the cell radius of macro cell base station 200A. More precisely, at this point, when it comes to distinction between macro cell base station 200A and small cell base station 200B, the cell radii are not taken into consideration in terms of size.

FIG. 1 illustrates that "MBS" denotes macro cell base station 200A, that "SBS" (Δ) denotes small cell base station 200B, and that "T" denotes terminal 100. A line that surrounds macro cell base station 200A denotes an image of a range where communication by macro cell base station 200A in question is available. A line that surrounds small cell base station 200B denotes an image of a range where communication by small cell base station 200B in question is available. A range where communication by base station 200 is available, for example, is determined according to a location and a radius of base station 200.

Terminal 100 and base station 200 set RATs that are used for communication, from RATs (for example, radio communication specification and radio frequencies) that are employed by the apparatuses in question, respectively, and perform radio communication according to the RATs that are set. It is possible that each of terminal 100 and base station 200 employ one or more RATs.

Radio communication specifications, for example, includes Long Term Evolution (LTE), Local Area Network (Wireless LAN), Digital Enhanced Cordless Telecommunication (DECT), Third Mobile Communication System (3G), Fourth Mobile Communication System (4G), and Fifth Mobile Communication System (5G).

RATs include RAT 1 to RAT 5, as pieces of specific information. RAT 1, for example, is LTE in which a radio frequency band is in a range of 700 HMz to 3 GHz. RAT 2, for example, is LTE-Advanced in which a radio frequency band is in a range of 15 GHz. RAT 3, for example, is Wireless LAN communication in which a radio frequency band in a range of 5 GHz. RAT 4, for example, is a radio communication scheme for a radio frequency band of 15

GHz, and is a fifth mobile communication scheme. RAT 5, for example, is a radio communication scheme (for example, a millimeter wave communication) (for example, WiGig) for a radio frequency band of 60 GHz.

Figure 2:
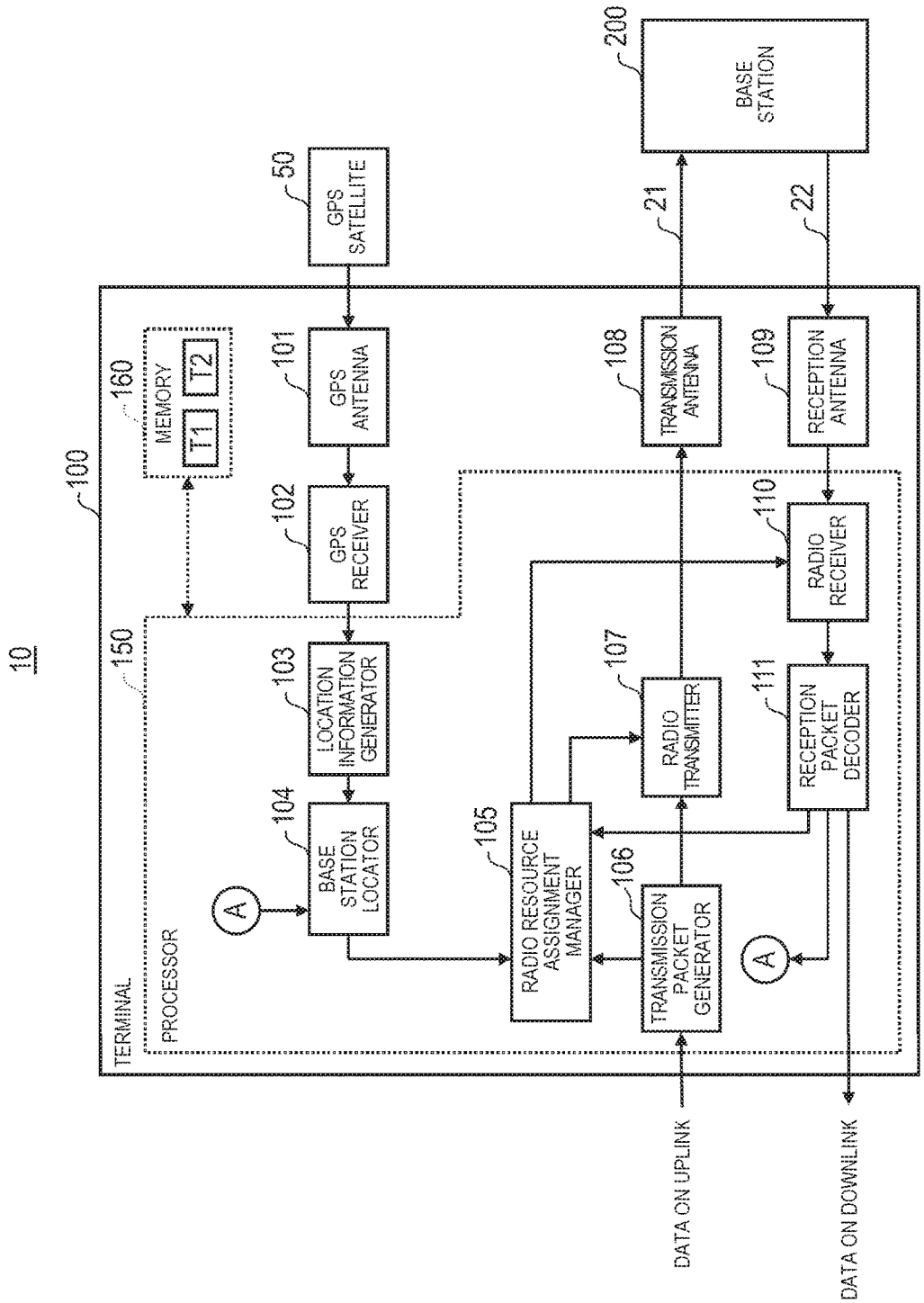
FIG. 2 is a block diagram illustrating an example of a configuration of a terminal according to the first embodiment.

FIG. 2 is a block diagram illustrating an example of a configuration of terminal 100. Terminal 100 includes processor 150, memory 160, Global Positioning System (GPS) antenna 101, GPS receiver 102, transmission antenna 108, and reception antenna 109.

Processor 150 performs various processing operations or controls in cooperation with memory 160. Specifically, processor 150 realizes a function of each of the following units by executing a program that is retained in memory 160. Units include the location information generator 103, base station locator 104, radio resource assignment manager 105, transmission packet generator 106, radio transmitter 107, radio receiver 110, and reception packet decoder 111.

For example, various pieces of data, information, programs are stored in Memory 160. Furthermore, history databases T1 and T2 are stored in memory 160. Memory 160 may be built into processor 150. Memory 160 may include not only a primary memory device, but also a secondary memory device.

FIG. 3 is a schematic diagram illustrating an example of history database T1. The history database T1 retains information, which is the history of communication (the record of communication) with a connection base station in every location in which terminal 100 is present. The connection base station is base station 200 that is connected to terminal 100 for communication. History database T1, for example, retains information relating to terminal 100, and information that is the history of communication with the connection base station during a past fixed period of time.

The information relating to terminal 100 includes location information (for example, longitude and latitude) of terminal 100, and identification information (for example, an area number) on an area in terminal 100 that stays. The information that is the history of communication includes identification information (for example, BS #6) of the connection base station, a RAT (for example, LTE) that is employed by the connection base station), and information on the number of times of communication (the number of times of radio communication with the connection base station and an amount of communication (an amount of communication data) relating to the communication with the connection base station.

Pieces of location information of terminal 100 are categorized by an area number and are managed. Furthermore, the history of communication between terminal 100 and the connection base station is managed and updated on a pre-area basis. The area in which terminal 100 stays represents a predetermined range where terminal 100 is present, and for example, is set to a size of 50 meters (m)×50 m. Furthermore, in an area that is heavily populated with base stations 200, an area of the area is set to be comparatively small, and for example, is set to a size of 20 m×20 m. Furthermore, in an area that is sparsely populated with base stations 200, an area of the area is set to be comparatively large, and for example, is set to a size of 200 m×200 m.

Figure 4:
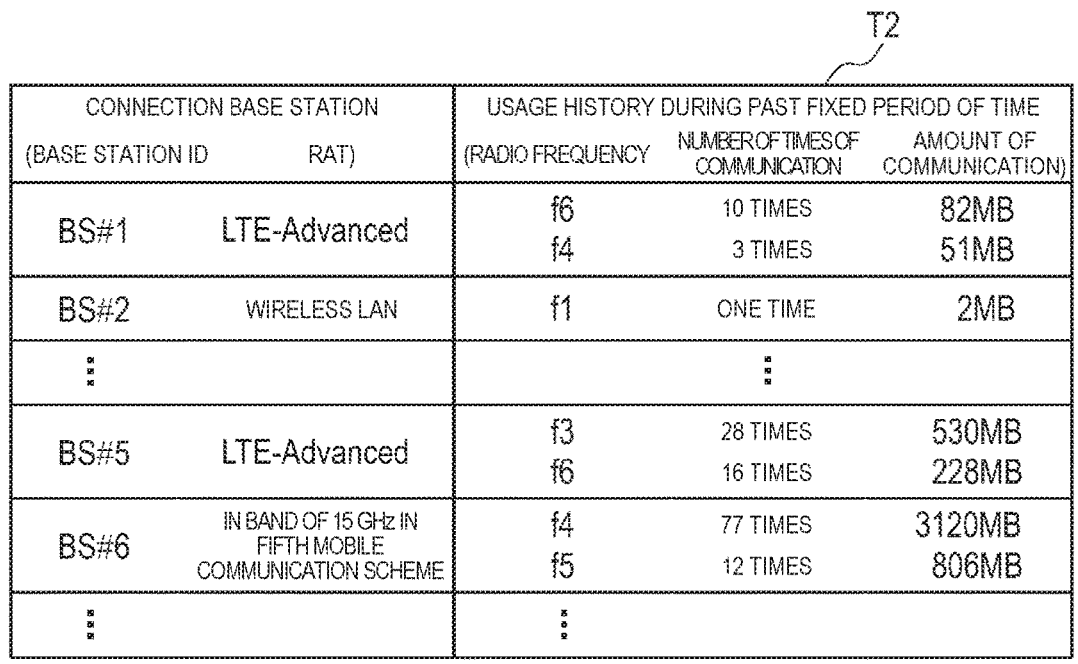
FIG. 4 is a schematic diagram illustrating an example of history database T2.

FIG. 4 is a schematic diagram illustrating an example of history database T2. For every connection base station, history database T2 retains information that is the usage history of a radio frequency that is used by terminal 100 to communicate with the connection base station. The history database T2, for example, retains information relating to the connection base station and information that is the usage history of a radio frequency for a past predetermined period of time.

The information relating to the connection base station includes the identification information of the connection base station (for example, BS #1), and information on the RAT that is employed by the connection base station. The information that is the usage history includes information on a radio frequency that is used for the communication with the connection base station, and the information on the number of times of communication with the connection base station and the amount of communication relating to the communication with the connection base station.

History databases T1 and T2 may be individually provided for uplink 21 and downlink 22, and may be provided in a shared manner. Furthermore, RATs that base station 200 is capable of employing, which are retained in history databases T1 and T2, is a RAT that terminal 100 is also capable of employing.

Uplink 21 is a radio link from terminal 100 to base station 200. Downlink 22 is a radio link from base station 200 to terminal 100. Radio links broadly include ones in various public circuit, a portable telephone circuit, and a wide-area broadband radio circuit, and the like.

GPS receiver 102 receives the location information (for example, information on latitude, longitude, and altitude) from GPS satellite 50 through GPS antenna 101. The location information indicates a current location of terminal 100.

Based on the location information from GPS satellite 50, and the like, the location information generator 103 generates the location information of terminal 100.

Referring to history database T1, base station locator 104 locates (for example, calculates) candidate base station 200 (hereinafter also referred to a "connection candidate base station") that is a target which is wirelessly connected by terminal 100. Specifically, based on information that is retained in history database T1 and the location information of terminal 100 (for example, current location information that is obtained by the GPS), base station locator 104 locates the connection candidate base station.

In this case, base station locator 104, for example, determines an area to which a current location of terminal 100 belongs. Referring to history database T1, base station locator 104, for example, determines base station 200 that has the largest amount of communication relating to communication with terminal 100 in the area to which terminal 100 belongs, as the connection candidate base station. Furthermore, referring to history database T1, base station locator 104, for example, determines base station 200 that has the greatest number of times of communication with terminal 100 in the area to which terminal 100 belongs, as the connection candidate base station. Furthermore, base station locator 104 may determine a plurality of base stations 200 that have the history of communication, as connection candidate base stations. In this case, base station locator 104 may set priority levels of the connection candidate base stations in order of decreasing the number of the histories of communication.

Radio resource assignment manager 105 acquires information of the connection candidate base station from base station locator 104. The information of the connection candidate base station, for example, includes information relating to which is a radio communication specification that is used between the connection candidate base station and terminal 100, or information relating to a frequency band. The information of the connection candidate base station may include information on the priority level of the connection candidate base station.

Radio resource assignment manager 105 performs management using pieces of information in history database T2, in such a manner that a radio resource which is used for the communication with the connection base station is assigned in cooperation with the connection base station among the connection candidate base stations. The radio source, for example, includes a radio frequency that is used for communication and a Resource Block (RB) in a radio frequency. The radio source, for example, includes a radio frequency that is used for communication and a Resource Block (RB) in a radio frequency.

Referring to history database T2, radio resource assignment manager 105 derives an assignment candidate for a radio frequency that is used for the communication with the connection base station, based on the usage history of the radio frequency that is used in the past by terminal 100.

For example, radio resource assignment manager 105 determines a radio frequency that appears frequently (more often) in the usage history, as the assignment candidate for the radio frequency that is to be assigned to communication in uplink 21. The radio frequency that appears frequently in the usage history, for example, may be a radio frequency, an amount of accumulated communications on which is the largest in history database T2, and may be a frequency, an amount of communication data on which is a predetermined amount or larger. As the candidates for the radio frequency, there may be a plurality of candidates ranging from a candidate having a high priority level to s candidate having a low priority level.

Radio resource assignment manager 105 reports to the connection base station the assignment candidate for the radio frequency. In the connection base station, a RB assignment situation in the radio frequency is searched for, based on the assignment candidate for the radio frequency, which is reported from terminal 100, it is determined whether or not a RB is available for assignment, and if the RB is available for assignment, a result of determination of which radio resource has to be used for data communication is transmitted to terminal 100. Referring to the result of the determination, radio resource assignment manager 105 performs the data communication. The determination result, for example, includes information on whether or not the RB is available for assignment, or information on the RB in the radio frequency that is assigned in a case where the RB is available for assignment.

Based on the result of the determination, radio resource assignment manager 105 assigns a RB that is not assigned in the radio frequency which is used for the communication with the connection base station.

Furthermore, radio resource assignment manager 105 may designate not only the assignment of a RB and Adaptive Modulation and Coding (AMC).

In a case where it is impossible that the radio resource in the radio frequency that is the assignment candidate is assigned, radio resource assignment manager 105 may change the radio frequency, and may newly select a radio frequency from among radio frequencies that are other assignment candidates. Furthermore, in a case where the radio frequency in which the RB that is available for assignment to the connection base station is not present, radio resource assignment manager 105 may change the connection base station, and may newly select a connection candidate base station from among other connection base stations.

Furthermore, radio resource assignment manager 105 acquires the information that is the usage history of the radio resource, from transmission packet generator 106 or reception packet decoder 11. The information that is the usage history, for example, includes the information on the radio frequency that is used for the communication between terminal 100 and the connection base station, and the information on the amount of communication that takes place during communication that uses the radio frequency. Radio resource assignment manager 105, for example, performs addition of the amount of communication that is included in the information on the usage history, for the radio frequency in history database T2, which is consistent with the radio frequency that is included in the acquired information on the usage history, and updates the information that is retained in history database T2.

Radio resource assignment manager 105 sends information on the radio resource that is assigned, more precisely, information on the radio frequency and the RB that is used for the communication with the connection base station, to radio transmitter 107 or radio receiver 110. In this case, radio resource assignment manager 105 sends information on a radio resource for uplink 21, which is assigned, to radio transmitter 107. Furthermore, radio resource assignment manager 105 sends information on a radio resource for downlink 22, which is assigned, to radio receiver 110.

Transmission packet generator 106 generates a packet (transmission packet) that is to be transmitted to base station 200. The transmission packet includes data on uplink 21. The data (control data or user data) on uplink 21 is obtained, for example, from memory 160, an external device (not illustrated), such as a storage device, and various software processors (not illustrated).

Furthermore, transmission packet generator 106 sends the information that is the usage history of the radio resource relating to communication of the transmission packet, to radio resource assignment manager 105.

Radio transmitter 107 transmits the transmission packet to the connection base station that is designated by radio resource assignment manager 105 through uplink 21 and transmission antenna 108, using the assigned radio resource.

Radio receiver 110 receives the packet (reception packet) from the connection base station through downlink 22 and reception antenna 109, using the radio resource that is assigned by radio resource assignment manager 105.

Reception packet decoder 111 decodes the reception packet, and obtains a decoded data. The decoded data includes data on downlink 22. The data (control data or user data) on downlink 22 is passed along, for example, to memory 160, an external device (not illustrated), such as a storage device or a display device, and various software processors (not illustrated).

Furthermore, in some cases, information of the connection candidate base station that is selected with a known method is included in the data on downlink 22. The information of the connection candidate base station is sent to radio resource assignment manager 105.

Furthermore, the data on downlink 22 includes control information relating to the radio resource assignment. The control information is sent to radio resource assignment manager 105. For example, a determination result of determining whether or not the RB is available for assignment by the connection base station is included in the control information.

Furthermore, reception packet decoder 111 sends the information that is the usage history of the radio resource relating to communication of the reception packet, to radio resource assignment manager 105.

[Operation and the Like]

Next, an example of operation of radio communication system 10 is described.

Figure 5:
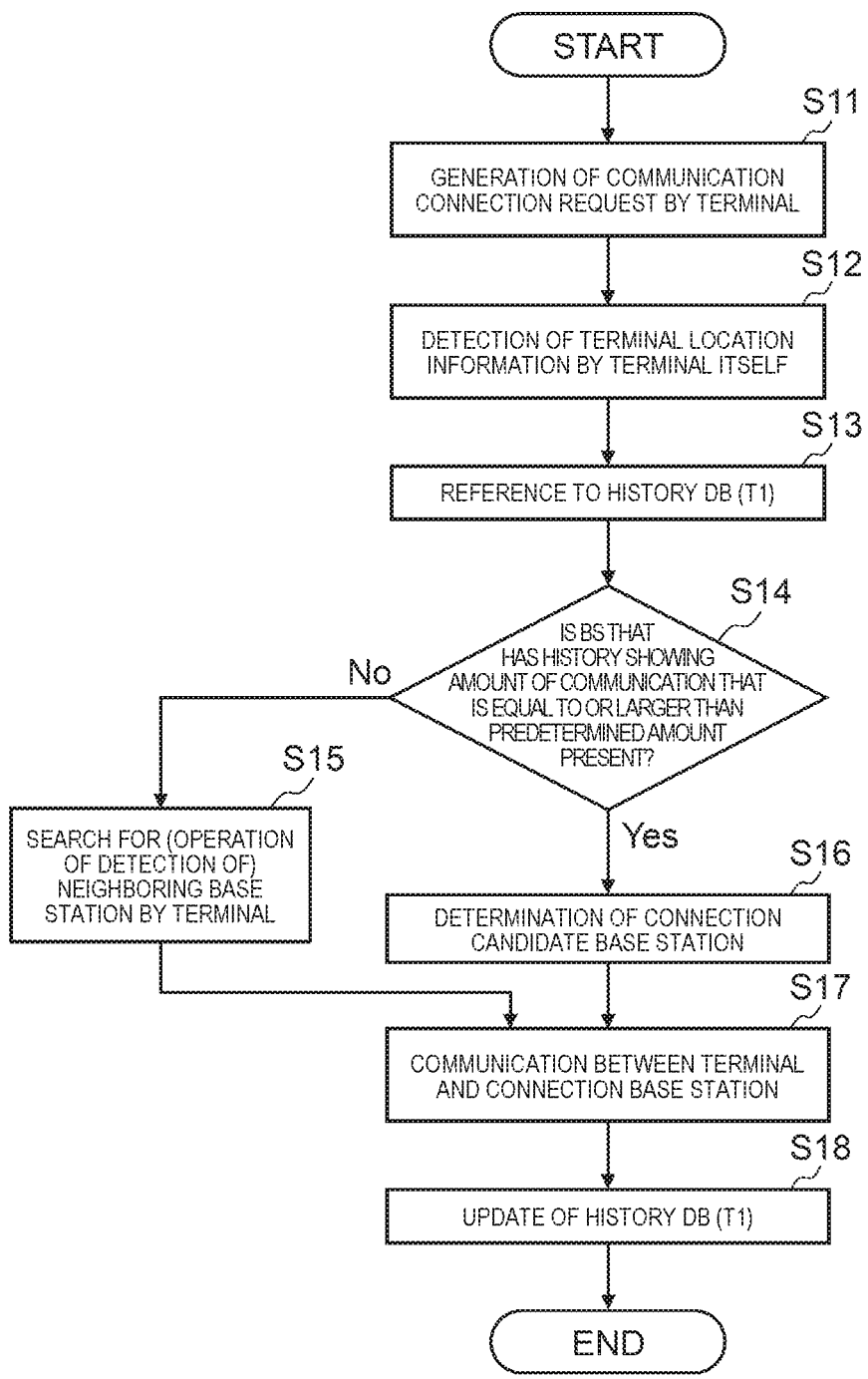
FIG. 5 is a flowchart illustrating an example of an operation that is performed when a connection candidate base station is located by a radio communication system.

FIG. 5 is a flowchart illustrating an example of an operation that is performed when terminal 100 locates the connection candidate base station.

Radio receiver 110 or radio transmitter 107 determines whether or not there is present a connection request (S11). Connection requests, for example, include a connection request from terminal 100 to base station 200, and a connection request from base station 200 to terminal 100. For example, in a case where terminal 100 acquires a moving image in a content server and reproduces the acquired moving image, the connection request from terminal 100 to base station 200 is made. For example, in a case where a call from another terminal to terminal 100 is made, the connection request form base station 200 to terminal 100.

GPS receiver 102, for example, detects (acquires) the location information (information on a current location) of terminal 100 from GPS satellite 50 (S12).

Referring to history database T1 (S13), base station locator 104 determines whether or not the current location that is acquired in GPS receiver 102 is included in area information. In a case where an area that is included in the current location is present, base station locator 104 determines whether nor base station 200 is present which has the history of communication showing that communication is performed, in the area, with an amount of communication which is a predetermined amount of communication or larger (S14).

In a case where an area in which the current location of terminal 100 is included is not present in history database T1, or in a case where base station 200 that has the history of communication described above is not present, base station locator 104 searches for (conducts a cell search of) base station 200 (S15) using a known method. In this case, based on a result of the search for base station 200 that stays in the vicinity of terminal 100, base station locator 104 determines a connection candidate base station.

In the known method, for example, base station locator 104 searches for base stations 200 that use RATs 1 to 5, in this order, and radio transmitter 107 notifies a predetermined base station of a result of the search. The predetermined base station selects a connection candidate base station according to the notified result of the search, and transmits information of the connection candidate base station to terminal 100. Base station locator 104 acquires the information of the connection candidate base station from the reception packet that is received by radio receiver 110 and is decoded by reception packet decoder 111, and makes the determination as the connection candidate base station.

At this point, as the known method, the example is provided in which the result of the cell search is notified to a predetermined base station and the predetermined base station transfers the information of the connection candidate base station to terminal 100. Instead, terminal 100 may determine the connection candidate base station on its own based on the result of the cell search without notifying the predetermined base station of the result of the cell search.

In a case where in S14, base station 200 that the history of communication described above is present, base station locator 104 determines base station 200 as a connection candidate base station (S16). Only one connection candidate base station may be determined, and a plurality of connection candidate base stations may be determined. Furthermore, in a case where the connection candidate base station is determined, base station locator 104 may set priority levels of the plurality of connection candidate base stations. For example, base station locator 104 sets a priority level of a connection candidate base station that has a large amount of communication, to be high.

When the connection candidate base stations are determined, radio resource assignment manager 105 determines the connection base station from the connection candidate base stations. In a case where one connection candidate base station is determined, radio resource assignment manager 105 selects base station 200 as a connection base station.

Furthermore, in a case where a plurality of determined connection candidate base stations are present, radio resource assignment manager 105, one is selected from among the plurality of determined connection candidate base stations. For example, radio resource assignment manager 105 may select a connection candidate base station that has a large amount of communication in the past communication, as a connection base station.

Furthermore, radio resource assignment manager 105 assigns a radio resource that is used for the communication with the connection base station. The assignment of the radio resource, as will be described below with reference to FIG. 6, may be performed based on information that is retained in history database T2, and may be performed with a known method. As the known method, for example, channel quality (an amount of interference) of every radio frequency is measured by terminal 100 or the connection base station, and a radio frequency that is to be used for the communication between terminal 100 and the communication with the connection base station is assigned.

Radio transmitter 107 or radio receiver 110 communicates user data between terminal 100 and the connection base station (S17). For example, transmission packet generator 106 generates the transmission packet that includes the data on uplink 21. Radio transmitter 107 wirelessly transmit the transmission packet to the determined connection base station. Furthermore, for example, radio receiver 110 wirelessly receives the reception packet from the determined connection base station. Reception packet decoder 111 decodes the reception packet and obtains the data on downlink 22.

Transmission packet generator 106 or reception packet decoder 111 updates history database T1 according to the history of communication (S18).

For example, transmission packet generator 106 updates history database T1 according to the transmission history of the transmission packet. In this case, in a case where terminal 100 performs communication in S17 after the processing in S15, transmission packet generator 106 newly writes a terminal location at the time of the radio transmission, a number of an area to which the terminal location belongs, and information on the number of times of communication or the amount of communication in the area, to history database T1. Furthermore, in a case where terminal 100 performs communication S17 after the processing in S16, transmission packet generator 106 updates history database T1 with the information on the amount of communication or the number of times of communication in the area to which the terminal location at the time of the radio transmission belongs.

For example, reception packet decoder 111 updates history database T1 according to the reception history of the reception packet. In this case, in a case where terminal 100 performs communication in S17 after the processing in S15, reception packet decoder 111 newly writes a terminal location at the time of the radio reception, a number of an area to which the terminal location belongs, and the number of times of communication or the amount of communication in the area, to history database T1. Furthermore, in a case where terminal 100 performs communication S17 after the processing in S16, reception packet decoder 111 updates history database T1 with the information on the amount of communication or the number of times of communication in the area to which the terminal location at the time of the radio reception belongs.

The communication in S17 may be either a bi-directional communication or any one of the transmission and the reception. Therefore, the updating of history database T1 in S18 may be performed at the time of either the transmission or the reception.

In this manner, in a case where the history of communication between terminal 100 and any base station 200 in an area to which terminal 100 belongs when performing communication is equal to or larger than a predetermined reference, terminal 100 does not need to search for (to conduct the cell search of, or discover) base station 200 with a known method. More precisely, terminal 100 does not need to sequentially scan the radio communication schemes (the RATs) that are employable, and to search base station 200 that is positioned in the vicinity of terminal 100. In this case, terminal 100 does not need to make as many cell searches as the number of RATs that are present in the heterogeneous network. For reason, terminal 100 can reduce processing load and the processing time for searching for base station 200 that is a connection destination.

On the other hand, in a case where the history of communication between terminal 100 and any base station 200 in an area to which terminal 100 belongs when performing communication is neither equal, nor larger than predetermined reference, more precisely, in a case where the number of the histories of communication is not sufficiently great, terminal 100 searches for base station 200 with a known method. In this case, it is considered that a state results where a radio frequency or a radio resource is selected for communication without sufficiently segregating radio frequencies or radio resources that are used by each base station 200 and without sufficiently taking into account the past history. In contrast, terminal 100 does not perform selection of the connection candidate base station that is based on the past history of communication. Thus, the precision of selection of the connection candidate base station can be improved and the precision of selection of the connection base station can be improved.

Figure 6:
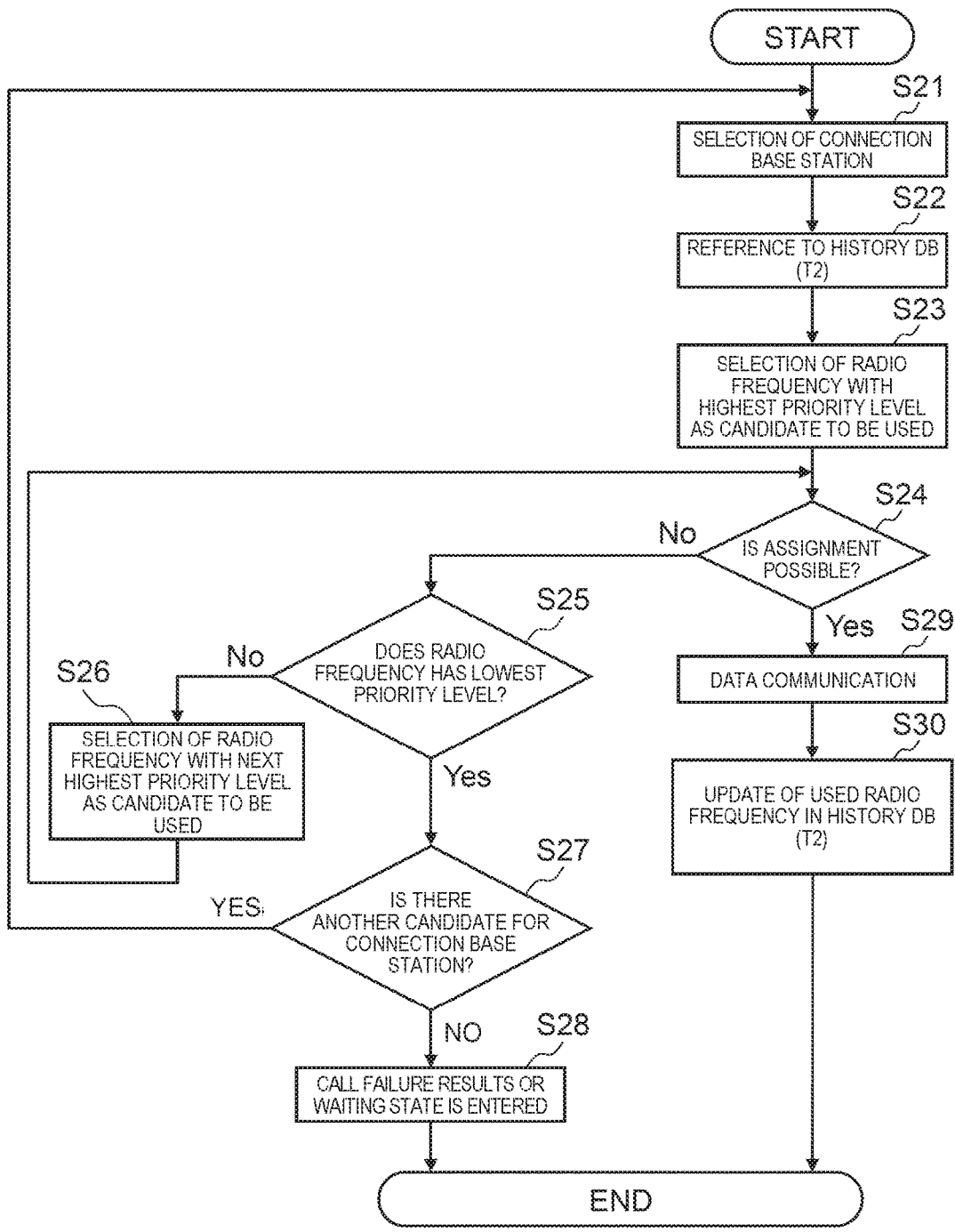
FIG. 6 is a flowchart illustrating an example of an operation that is performed when a radio frequency that is used by a terminal is derived by the radio communication system.

FIG. 6 is a flowchart illustrating an example of an operation that is performed when a radio frequency that is used by terminal 100 is assigned. In FIG. 6, it is assumed that assignment of the radio resource, selection of the assignment candidate for the radio resource, and the communication of the user data are performed at least one of uplink 21 and downlink 22.

First, when the connection request from terminal 100 to base station 200, or the connection request from base station 200 to terminal 100 occurs, base station locator 104 selects the connection base station (S21). A method of selection the connection base station (a location method) may be the method that is described with reference to FIG. 5, and may be a known method.

Referring to history database T2 (S22), radio resource assignment manager 105 selects a radio frequency, the frequency of whose use is high (the number of the histories of whose use is great) as the assignment candidate for the radio frequency, as is the case when an amount of communication is large in the selected connection base station (S23).

With the method described above, radio resource assignment manager 105 can know whether or not it is possible that a RB is assigned in the assignment candidate for the radio frequency (S24). More precisely, when the assignment candidate for the radio frequency is selected, terminal 100 shares information on the assignment candidate for the radio frequency with the connection base station. The connection base station checks a situation where a RB in the radio frequency is assigned to terminal 100 that belongs to the connection base station, and determines whether or not the RB in the radio frequency is assigned to terminal 100. The connection base station feedbacks a result of the assignment of the RB in the radio frequency to terminal 100. In a case where it is possible that the RB in the radio frequency is assigned, the connection base station assigns the RB to terminal 100, and thus communicates data with terminal 100.

In S24, in a case where it is impossible that the RB in the selected radio frequency is assigned, radio resource assignment manager 105 determines whether or not a priority level of the radio frequency that is decided to be the assignment candidate is the lowest (S25).

For example, in a case where processing in S25 is the first one, for example, the priority level of the radio frequency that is the assignment candidate is the highest, and whenever the number of times that the processing in S25 is performed, the priority level of the radio frequency that is the assignment candidate is lowered.

In S25, in a case where the priority level of the radio frequency that is decided to be the assignment candidate is not the lowest, radio resource assignment manager 105 selects a radio frequency of which a priority level is lower than that of the radio frequency in question, more precisely, a radio frequency of which a priority level is the next most one, as an assignment candidate (S26). Then, terminal 100 proceeds to processing in S24.

In a case where in S25, the priority level of the radio frequency that is decided to be the assignment candidate, based on the information of the connection candidate base station from base station locator 104, radio resource assignment manager 105 determines whether or not the connection candidate base station is present in another area (S27). In a case where the connection candidate base station is present in another area, terminal 100 proceed to S21.

In a case where the connection candidate base station is not present in another area, the connection request described above results in a call failure or enters a waiting state, without the radio resource being assigned in response to the connection request (S28). Terminal 100 ends the processing in FIG. 6.

In a case where it is possible in S24 that the RB in the radio frequency is assigned, radio resource assignment manager 105 assigns the RB in the radio frequency, which is allocable. Radio transmitter 107 or radio receiver 110 communicates user data with the connection base station using the RB in the radio frequency, that is assigned (S29).

When the user data is communicated, the information on the amount of communication that takes place during communication is sent to radio resource assignment manager 105. For example, transmission packet generator 106 sends the information on the amount of communication of the transmission packet that is transmitted, to radio resource assignment manager 105. For example, reception packet decoder 111 sends the information on the amount of communication of the reception packet that is received, to radio resource assignment manager 105. Radio resource assignment manager 105 updates the history of communication on the radio frequency that is used in the connection base station which performs communication, in history database T2 (S30). Terminal 100 ends the processing in FIG. 6.

In this manner, terminal 100 can assign a radio frequency that has a low likelihood of communication interference's occurring, using the information that is the usage history of the radio frequency in the past, which relates to the communication of the user data. Furthermore, in a case where it is impossible that the RB in the radio frequency that is the assignment candidate is assigned, because a RB in another radio frequency is assigned or the connection base station is changed, there is a high likelihood that terminal 100 will be able to discover a radio frequency for communication user data. More precisely, terminal 100 can improve the efficiency of assignment of or the efficiency of usage of a radio resource. Therefore, terminal 100 can segregate the radio frequencies that are used for the communication with base station 200, in an autonomous and distributive manner.

[Effects and the Like]

Terminal 100 stores history database T1 that results from associating a location of terminal 100 itself and information that is the history of communication by base station 200 that has the history of communication, with each other. When the connection request occurs, terminal 100 specifies the connection candidate base station, referring to history database T1. Accordingly, terminal 100 can take an initiative to determine base station 200 to which terminal 100 itself has to make a connection, without base station 200 retaining history database T1.

Furthermore, terminal 100 can reduce the need to perform excessive cell search processing for specifying the connection candidate base station, can reduce power consumption by terminal 100 itself, and can reduce the time it takes to search for the connection candidate base station.

Furthermore, in a connection base station that performs communication frequently, because an amount of data that is accumulated in history database T1 is large, there is a high likelihood that the connection base station will be selected as a connection candidate base station. More precisely, because the connection base station is selected based on the history of communication showing the successful communication, the likelihood that a connection base station which has a high likelihood of the communication connection being successful will be selected is increased. There is a high likelihood that the communication with the connection base station which performs communication frequently in the past will be successful in the future. Therefore, terminal 100 can improve the precision of communication in the communication with the connection base station.

In a case where a location in which communication by terminal 100 is performed, more precisely, in a case where the location of terminal 100 is not too frequently, a method of specifying the connection candidate base station or the connection base station according to the present embodiment is particularly effective. As terminal 100 in this case, for example, an electronic billboard, a vending machine, or a construction machine is considered. As the communication in this case, for example, a Machine to Machine (M2M) communication, in-home communication, or in-office communication is considered.

Terminal 100 stores history database T2 in which the information that is the usage history of the radio frequency relating to the communication with the connection base station. Referring to history database T2, terminal 100 assigns a radio resource (a radio frequency or a RB) when the connection request occurs. Accordingly, terminal 100 can take an initiative to determine a radio resource that has to be used for communication, without base station 200 retaining history database T2.

Furthermore, terminal 100 can reduce the need to perform detection processing of an enormous amount of channel quality information for determining an environment in which a radio frequency is used.

It is indicated that a radio frequency, the number of the histories of communication of whose is great (for example, an amount of communication on which is large), is a radio frequency in which communication interference is comparatively smaller in the connection base station that employs the radio frequency than in base stations in the vicinity. Therefore, the assignment of such a radio frequency for the communication with the connection base station is suitable.

Furthermore, because an amount of data that is accumulated is large when it comes to a radio frequency that is frequently used in the past, there is a high likelihood that this radio frequency will be selected as a candidate. There is a high likelihood that the radio frequency which is used frequently in the past will make communication between the connection base station and the communication with terminal 100 successful in the future as well. Therefore, terminal 100 can improve the precision of communication in the communication with the connection base station.

Therefore, in the heterogeneous network, terminal 100 can reduce the number of times that the communication interference (intercell interference) among a plurality of base stations 200 occurs, and can suppress assignment processing a radio resource for data retransmission from being frequently performed.

Accordingly, terminal 100 can exactly determine which radio frequency has to be assigned for which base station 200. Furthermore, terminal 100 can reduce power consumption by terminal 100 when searching for base station 200 that is connected to terminal 100, and can reduce the time it takes to search for base station 200. Furthermore, terminal 100 can improve the efficiency of assignment of or the efficiency of usage of the radio resource that is used for the communication with the connection base station.

[Communication Environment of the Radio Communication System]

Next, a communication environment of radio communication system 10 is described.

At this point, as an example, it is assumed that the connection base station employs RAT 5. It is also decided that terminal 100 employs the RAT 5. Furthermore, it is assumed that eight usable radio frequencies are present in RAT 5. The eight radio frequencies in RAT 5 are expressed as $f_{5,1}$, $f_{5,2}$, $f_{5,3}$, $f_{5,4}$, $f_{5,5}$, $f_{5,6}$, $f_{5,7}$, and $f_{5,8}$, respectively. For example, $f_{5,1}$ indicates a first radio frequency in RAT 5.

Figure 7:
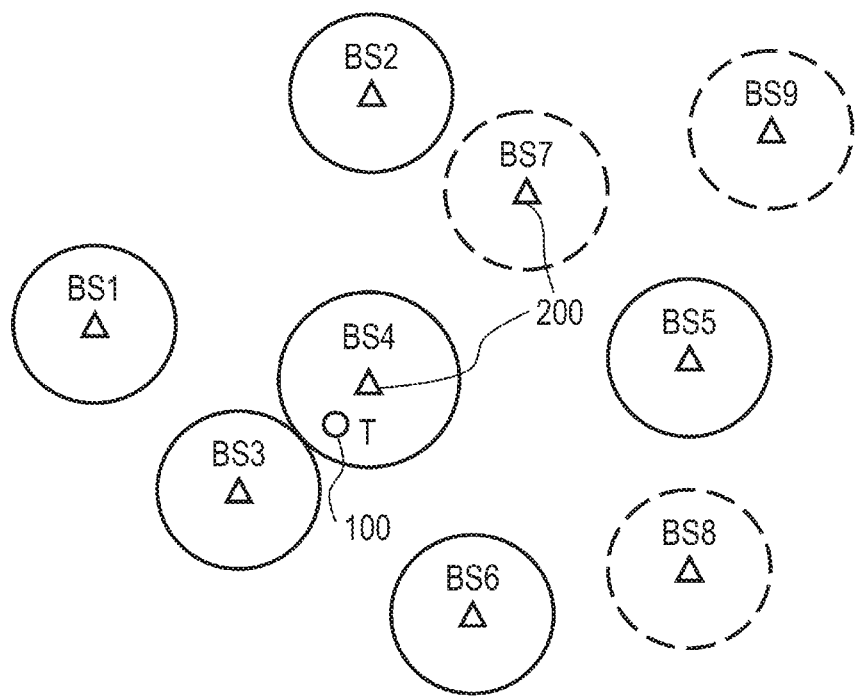
FIG. 7 is a schematic diagram illustrating an example of a location relationship between a base station and the terminal.

FIG. 7 is a schematic diagram illustrating an example of a location relationship between base station 200 and terminal 100. It is assumed that base stations 200 (BS1 to BS9) that are illustrated in FIG. 7 are present in the vicinity of terminal 100 (terminal T) and that it is possible that RAT 5 is employed.

In FIG. 7, base stations 200 (BS1 to BS6) that are surrounded by solid lines are base stations of a communications carrier to whom terminal 100 subscribes. Base stations 200 (BS7 to BS9) that are surrounded by dotted lines are base stations of a communications carrier who is different from the communications carrier to whom terminal 100 subscribes.

In FIG. 7, base station 200 as the connection base station is BS 4. However, although only base stations 200 that are present in the vicinity are considered, terminal 100 shares the eight radio frequencies $f_{5,1}$ to $f_{5,8}$ with BS 1 to BS 9. Therefore, when terminal 100 performs communication with BS 4, there is a likelihood that radio frequencies will overlap which are in use by the other base stations, BS 1 to BS 3 and BS 5 to BS 9, and that communication quality will be degraded due to mutual interference.

As a comparative example, it is assumed that in order to alleviate the degradation in the communication quality, each terminal detects the channel quality of an in-use radio channel (for example, a radio frequency that is employed by in-use RAT 5) and notifies a base station of the detected channel quality. In this case, the terminal needs to monitor the channel quality of the eight radio frequencies $f_{5,1}$ to $f_{5,8}$ in RAT 5. A result of the channel quality needs to be notified to the base station.

In the comparative example, it is also considered that a predetermined base station detects the channel quality of the radio circuit that is in use by the base station of the same communications carrier. However, the base station has difficulty integrating in an inclusive manner pieces of information on circuit qualities of radio circuits that are in use by base stations of a different communications carrier. In the future, in a case where it is possible that a plurality of different communications carriers assign the same radio frequency, a countermeasure against the interference described above is further needed.

In contrast, in the present embodiment, terminal 100 derives the assignment candidate for the radio frequency according to the past usage history in which each radio frequency is used, and thus there is no need to take into consideration which radio frequency is assigned to other base stations 200. For this reason, terminal 100 does not need to take into account which communications carrier possess base station 200, and can assign the radio frequency without interference to the connection base station with ease and precision.

In this manner, because terminal 100 assigns the radio frequency according to the history of communication between terminal 100 and base station 200, there is no need to detect channel quality information on the radio frequency that is usable by each RAT. The channel quality information, for example, includes a Signal to Interference Noises Ratio (SINR). Therefore, terminal 100 does not need to notify base station 200 of the channel quality information described above.

More precisely, terminal 100 does not need to perform detection of the circuit qualities of the radio frequencies of which the number is the same as the number of the radio frequencies that are employed by the RAT that is present in the heterogeneous network. For this reason, terminal 100 can reduce the processing load and the processing time for detecting the channel quality of each radio frequency. Furthermore, the connection base station does not need to frequently perform delivery of the channel quality information on each radio frequency, between connection base station itself and terminal 100, and can reduce the processing load and the processing time relating to the notification of the channel quality of each radio frequency.

In this manner, terminal 100 stores history database T2 that retains the information that is the history of communication on every radio frequency relating to the communication with the connection base station. After the determination of the connection base station, terminal 100, for example, determines the priority levels, in order of decreasing an amount of communication on a radio frequency as the history of communication that is retained in history database T2, and determines whether or not a resource (a radio frequency or a RB) is assigned. Accordingly, terminal 100 can determine the radio resource that is used for communication, with base station 200 retaining history database T2.

Other Embodiments

The first embodiment is described above as an example of the technology in the present disclosure. However, the technology in the present disclosure is not limited to the present disclosure, and can apply also to an embodiment than results from performing change, substitution, addition, omission, and the like.

In the first embodiment, history database T1 is described as retaining the information that is the history of communication with the connection base station during a past fixed period of time, but the information that is the history of communication may be accumulated regardless of a period of time. Furthermore, history database T2 is described as retaining the usage history of the radio frequency during the past fixed period of time, but the information that is the usage history may be accumulated.

In the first embodiment, in terminal 100, base station locator 104 locates the connection candidate base station based on history database T1, and then, radio resource assignment manager 105 may assign the radio frequency that is used for the communication with base station 200, using a known method. Furthermore, in terminal 100, base station locator 104 locates the connection candidate base station using a known method, and then radio resource assignment manager 105 may assign the radio frequency that is used for the communication with base station 200, based on history database T2.

In the first embodiment, as an example, an accumulation value of the amount of communication in every location in which terminal 100 is present is described as being used as the information that is the history of communication with base station 200, but information that is another history of communication may be used. The information that is another usage history, for example, includes a total amount of time taken for the communication with base station 200 (a total amount of connection time) and the number of times of communication (the number of times of connection) with base station 200. For example, the larger the total amount of communication time described above and the greater the number of times of communication described above, the higher the priority level, based on which base station 200 is selected as the connection base station.

In the first embodiment, as an example, the accumulation value of the amount of communication on every radio frequency is described as the information that is the usage history of the radio resource, but information that is another usage history may be used. The information that is another usage history, for example, includes a total amount of communication time (a total amount of connection time) between terminal 100 and base station 200, which uses the radio frequency, and the number of times of communication (the number of times of connection) between terminal 100 and the communication with base station 200, which uses the radio frequency. For example, the larger the total amount of communication time described above and the greater the number of times of communication described above, the higher the priority level based on which the radio frequency is selected.

As disclosed in the reference patent literature, Japanese Patent Unexamined Publication No. 2013-232815, history databases T1 and T2 may be provided in a distinguished manner from various points of view. For example, history databases T1 and T2 may be provided, in a distinguished manner, for every time span for which the radio resource is assigned or for every transmission power of base station 200. Furthermore, history databases T1 and T2 may be provided, in a distinguished manner, for every uplink 21 and every downlink 22. Furthermore, with other known methods, history databases T1 and T2 may be provided. Accordingly, terminal 100 can determine the connection candidate base station or the assignment candidate for the radio frequency according to the history of communication or the usage history that reflects various tendencies.

In the first embodiment, as an example, by managing the usage history of the amount of communication on every radio frequency, terminal 100 is described as determining as the radio resource the candidates for the radio frequency that is used for the communication with base station 200. By managing not only the radio frequency but also the usage history of the amount of communication in every time slot (every section on the time axis) on a certain radio frequency, terminal 100 may determine a candidate for a time slot that is to be used for the communication with base station 200. Furthermore, by managing the usage history of the amount of communication in every combination of the radio frequency and the time slot (section in the time axis) on the radio frequency, terminal 100 may determine a candidate for the combination of the radio frequency and the time slot, which is the radio resource that is used for the communication with base station 200.

For example, in a case where one radio frequency f1 is present and where the one radio frequency is divided into 16 time slots (TSs), for management, terminal 100 may update the usage history of the past amount of communication on each of 16 radio resources, f1-TS1, f1-TS2, and so forth up to f1-TS16. Accordingly, terminal 100 can segregate radio resources (time slots here) into ones for the neighboring base stations.

Furthermore, for example, in a case where two radio frequencies f1 and f2 are present and where each radio frequency is divided into 10 time slots, for management, terminal 100 may update the usage history of the past amount of communication on each of 20 radio resources, f1-TS1, f1-TS2 and so forth up to f1-TS10, and f2-TS1, f2-TS2 and so forth up to f2-TS20. Accordingly, terminal 100 can segregate radio frequencies (combinations of the radio frequency and the time slot) into ones for the neighboring base stations.

In the first embodiment, processor 150 may physically employ any configuration. However, if a processor that is programmable is used, because details of processing can be changed with a change in a program, the degree of freedom in designing processor 150 can be increased. Furthermore, processor 150 may be configured into one semiconductor chip, and may be physically configured into a plurality of semiconductor chips. In a case where processor 150 is configured into the plurality of semiconductor chips, each control in the first embodiment may be realized as a semiconductor chip. In this case, it can be considered that one processor 150 is configured into these semiconductor chips. Furthermore, processor 150 may be configured into a unit (a capacitor or the like) that has a different function than the semiconductor chip. Furthermore, one chip may be configured in such a manner that a function which processor 150 has and a function other than the function that processor 150 has are realized.

Outline of the Embodiment in the Present Disclosure

As described above, terminal 100 in the embodiment described above communicates with base station 200 through a network in which a plurality of radio communication scheme are present for use in a mixed manner. Terminal 100 includes processor 150 and an antenna. Processor 150 acquires the location information of terminal 100, and based on the location information of terminal 100 and on the information that is the history of communication with base station 200 in every location in which terminal 100 is present, locates a connection base station as base station 200 that communicates the user data with terminal 100, among a plurality of base station 200. Through the antenna, the user data is communicated between terminal itself and the connection base station.

Terminal 100 is an example of a radio communication terminal. Base station 200 is an example of a radio base station apparatus. The antenna, for example, is transmission antenna 108 or reception antenna 109.

Accordingly, terminal 100 can selectively base station 200 as a communication destination of the user data in the heterogeneous network that has a different radio communication scheme or satisfies characteristics of different base station 200. For this reason, terminal 100 can reduce the inconvenience of selecting base station 200. Therefore, terminal 100 can reduce the power consumption by terminal 100 when searching for base station 200, and can reduce the time it takes to search for base station 200.

Furthermore, processor 150 may locate a connection base station, preferentially base station 200 that has many of the histories of communication.

Accordingly, because it is possible that the connection base station that has a high likelihood of succeeding in the communication of the user data, terminal 100 can improve the precision of the communication of the user data.

Furthermore, the information that is the history of communication may include an amount of data communication that takes place during communication with base station 200, the data communication time for which the communication with base station 200 is performed, or the number of times that the data communication with base station 200 is performed.

Furthermore, terminal 100 may include memory 160 in which the information that is the history of communication with base station 200 in every location in which terminal 100 is present is stored. Based on the history of communication relating to the communication of the user data between the connection base station to which the user data is communicated through the antenna, and the connection base station, processor 150 may update the information that is the history of communication which is accumulated in memory 160.

Accordingly, whenever terminal 100 communicates the user data with base station 200, the latest history of communication with the connection base station can be reflected. Accordingly, terminal 100 can improve the efficiency of the selection of the connection base station.

Furthermore, the base station assignment method in the embodiment described above is a base station assignment method in which terminal 100 communicates with base station 200, through a network in which a plurality of radio communication schemes are present for use in a mixed manner. In this method, the location information of terminal 100 is acquired, and based on the location information of terminal 100 and on the information that is the history of communication with base station 200 in every location in which terminal 100 is present, a connection base station is located as base station 200 that communicates the user data with terminal 100, among a plurality of base station 200 and the user data is communicated between terminal 100 and the connection base station.

Accordingly, terminal 100 can selectively base station 200 as a communication destination of the user data in the heterogeneous network that has a different radio communication scheme or satisfies characteristics of different base station 200. For this reason, terminal 100 can reduce the inconvenience of selecting base station 200. Therefore, terminal 100 can reduce the power consumption by terminal 100 when searching for base station 200.

Furthermore, in terminal 100 in the embodiment described above, processor 150 locates a connection base station as base station 200 that communicates the user data with terminal 100, among a plurality of base stations 200. Based on the information that is the usage history of the radio frequency relating to the communication of the user data with every base station 200, processor 150 assigns the radio frequency relating to the communication of the user data between the connection base station and terminal 100. Through the antenna, the user data is communicated between terminal itself and the connection base station using the assigned radio frequency.

Accordingly, terminal 100 can reduce the number of times that the communication interference between terminal 100 and base station 200 in the vicinity occurs. For this reason, terminal 100 reduces the number of times that a radio source assignment operation is repeated, and thus can shorten the time it takes to assign the radio resource to terminal 100 or base station 200. More precisely, terminal 100 can improve the efficiency of the assignment of the radio resource. Furthermore, terminal 100 can improve the efficiency of the usage of the radio resource without dividing the frequency in advance among a plurality of base stations 200.

In some cases, base station 200 can be configured only with the base station of the same communications carrier, or can be configured in such a manner that the same radio resource is shared among base stations of a plurality of different communications carriers. Even with these configurations, terminal 100 can determine the assignment of the radio resource without a plurality of base stations 200 sharing information with each other.

Furthermore, for every base station 200, terminal 100 may include memory 160, in which the information that is the usage history of the radio frequency according to the communication of the user data is accumulated. Based on the radio frequency that is used for the communication of the user data through the antenna, and on the usage history of the radio frequency, processor 150 may update the information that is the usage history which is accumulated in memory 160.

Accordingly, whenever terminal 100 communicates the user data with base station 200, the latest usage history of the radio resource can be reflected. Accordingly, terminal 100 can improve the efficiency of the assignment of or the efficiency of the usage of the radio resource.

Furthermore, processor 150 may assign the radio frequency, preferentially the radio frequency that has many of the usage histories.

Accordingly, because the radio frequency that has a high likelihood of succeeding in the communication of the user data is allocable, terminal 100 can improve the precision of the communication of the user data.

The information that is the usage history may include an amount of data communication that uses the radio frequency, the data communication time for which the radio frequency is used, or the number of times that the data communication which uses the radio frequency is performed.

Furthermore, based on the information that is the usage history of the radio frequency relating to the communication of the user data with every base station 200, processor 150 may assign the assignment candidate for the radio frequency relating to the communication of the user data between the connection base station and terminal 100. In a case where it is impossible that the radio frequency that is the assignment candidate is assigned, processor 150 may assign another radio frequency. Through the antenna, the user data may be communicated using the another radio frequency.

Accordingly, even in a case where no radio frequency that is the assignment candidate is unoccupied, terminal 100 can re-designate another radio frequency, and can improve the likelihood that terminal 100 and the connection base station will be able to communicate the user data.

Furthermore, in a case where it is impossible that the radio frequency that is the assignment candidate is assigned, processor 150 may change the connection base station to another connection base station.

Accordingly, even in the case where no radio frequency that is the assignment candidate is unoccupied, terminal 100 can re-designate another connection base station, and can improve the likelihood that terminal 100 and the connection base station will be able to communicate the user data.

Furthermore, the frequency assignment method in the embodiment described above is a frequency assignment method in terminal 100 between terminal 100 itself and base station 200, through a network in which a plurality of radio communication schemes are present for use in a mixed manner. In the method, the connection base station as base station 200, among a plurality of base stations 200, that communicates the user data with terminal 100 is located, the radio frequency relating to the communication of the user data between the connection base station and terminal 100 is assigned based on the information that is the usage history of the radio frequency according to the communication of the user data with every base station 200, and the user data is communicated with the connection base station using the assigned radio frequency.

Accordingly, terminal 100 can reduce the number of times that the communication interference between terminal 100 and base station 200 in the vicinity occurs. For this reason, terminal 100 reduces the number of times that a radio source assignment operation is repeated, and thus can shorten the time it takes to assign the radio resource to terminal 100 or base station 200. More precisely, terminal 100 can improve the efficiency of the assignment of the radio resource. Furthermore, terminal 100 can improve the efficiency of the usage of the radio resource without dividing the frequency in advance among base stations 200.

INDUSTRIAL APPLICABILITY

The present disclosure is useful for a radio communication terminal, a frequency assignment method, and the like that can improve the efficiency of assignment of or the efficiency of usage of a radio resource for communicating user data between a radio communication terminal and a radio base station apparatus.

REFERENCE MARKS IN THE DRAWINGS

10 RADIO COMMUNICATION SYSTEM
21 UPLINK
22 DOWNLINK
50 GPS SATELLITE
100 TERMINAL
101 GPS ANTENNA
102 GPS RECEPTION
103 LOCATION INFORMATION GENERATOR
104 BASE STATION LOCATOR
105 RADIO RESOURCE ASSIGNMENT MANAGER
106 TRANSMISSION PACKET GENERATOR
107 RADIO TRANSMITTER
108 TRANSMISSION ANTENNA
109 RECEPTION ANTENNA
110 RADIO RECEIVER
111 RECEPTION PACKET DECODER
200 BASE STATION
T1, T2 HISTORY DATABASE

The invention claimed is:

1. A radio communication terminal configured to communicate with a radio base station apparatus through a network in which a plurality of radio communication schemes are present for use in a mixed manner, the radio communication terminal comprising:
 a processor; and
 an antenna,
 wherein the processor, in operation, selects a connection base station as a radio base station apparatus that communicates user data with the radio communication terminal, among a plurality of radio base station apparatuses, based on a comparison between a predetermined threshold and an amount of data communication transmitted between the radio communication terminal and the connection base station,
 wherein the processor, in operation, assigns a radio frequency relating to communication of the user data between the connection base station and the radio communication terminal, based on information that includes a usage history of a radio frequency relating to the communication of the user data with the plurality of radio base station apparatuses, and
 wherein, through the antenna, the user data is communicated between the radio communication terminal and the connection base station using the assigned radio frequency.

2. The radio communication terminal of claim 1, further comprising:
 a memory in which the information that includes the usage history of the radio frequency relating to the communication of the user data is accumulated for the plurality of radio base station apparatuses,
 wherein the processor, in operation, updates the information that includes the usage history which is accumulated in the memory, based on the assigned radio frequency that is used for the communication of the user data through the antenna, and the usage history of the radio frequency.

3. The radio communication terminal of claim 2,
 wherein the processor, in operation, assigns the radio frequency, giving a preference for a radio frequency that has many of the usage histories.

4. The radio communication terminal of claim 2,
 wherein the information that includes the usage history of the radio frequency includes an amount of data communication that uses the radio frequency, a data communication time for which the radio frequency is used, or a number of times that the data communication which uses the radio frequency is performed.

5. The radio communication terminal of claim 1,
 wherein the processor, in operation, assigns another radio frequency in a case where it is impossible to assign the radio frequency, and
 wherein, through the antenna, the user data is communicated between the radio communication terminal and the base station using the another radio frequency.

6. The radio communication terminal of claim 1,
 wherein the processor, in operation, changes the connection base station to another connection base station in a case where it is impossible to assign the radio frequency.

7. The radio communication terminal of claim 1, wherein the connection base station is selected in response to the amount of data communication being equal to or larger than the predetermined threshold.

8. A frequency assignment method for use in a radio communication terminal that communicates with a radio base station apparatus through a network in which a plurality of radio communication schemes are present for use in a mixed manner, the method comprising:
 selecting a connection base station as a radio base station apparatus that communicates user data with the radio communication terminal, among a plurality of radio base station apparatuses, based on a comparison between a predetermined threshold and an amount of data communication transmitted between the radio communication terminal and the connection base station;
 assigning a radio frequency relating to communication of the user data between the connection base station and the radio communication terminal, based on information that is the usage history of a radio frequency relating to the communication of the user data with the plurality of radio base station apparatuses; and
 communicating the user data with the connection base station using the assigned radio frequency.

* * * * *